US007448899B2

(12) United States Patent
Chen et al.

(10) Patent No.: US 7,448,899 B2
(45) Date of Patent: Nov. 11, 2008

(54) CONNECTING MODULE FOR COMMUNICATION

(75) Inventors: Chin-Hao Chen, Taoyuan Hsien (TW);
Ming-Chia Wu, Taoyuan Hsien (TW);
Chih-Hsiao Chen, Taoyuan Hsien (TW);
Te-Shen Yang, Taoyuan Hsien (TW);
Ming-Hsing Chung, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 112 days.

(21) Appl. No.: 11/404,035

(22) Filed: Apr. 14, 2006

(65) Prior Publication Data

US 2006/0238923 A1  Oct. 26, 2006

(30) Foreign Application Priority Data

Apr. 22, 2005  (TW) .............................. 94112961 A
Nov. 11, 2005  (TW) .............................. 94219577 U

(51) Int. Cl.
*H01R 13/64* (2006.01)
(52) U.S. Cl. ...................................... 439/372; 439/484

(58) Field of Classification Search ................... 385/92, 385/88, 89, 139; 439/372, 484
See application file for complete search history.

(56) References Cited

U.S. PATENT DOCUMENTS

| 6,178,096 | B1 * | 1/2001 | Flickinger et al. ............ 361/816 |
| 6,533,603 | B1 * | 3/2003 | Togami ....................... 439/372 |
| 6,556,445 | B2 * | 4/2003 | Medina ........................ 361/728 |
| 6,786,653 | B1 * | 9/2004 | Hwang et al. ................... 385/92 |
| 6,805,574 | B2 * | 10/2004 | Huang ......................... 439/357 |
| 6,908,323 | B2 * | 6/2005 | Ice ............................. 439/160 |
| 6,916,123 | B2 * | 7/2005 | Kruger et al. ................... 385/92 |
| 7,033,204 | B1 * | 4/2006 | Wang .......................... 439/372 |
| 2003/0049000 | A1 * | 3/2003 | Wu ............................ 385/92 |

* cited by examiner

*Primary Examiner*—Briggitte R Hammond
(74) *Attorney, Agent, or Firm*—Birch, Stewart, Kolasch & Birch, LLP

(57) ABSTRACT

A connecting module comprises a body, a housing and a transmission device disposed in the body. The transmission device comprises a fixed element having a guiding slot, a slider and a movable bar. The movable bar drives the slider to horizontally move along the guiding slot, to disengage the body from the housing.

16 Claims, 13 Drawing Sheets

CONNECTING MODULE FOR COMMUNICATION

BACKGROUND

The invention relates to a connecting module, and in particular to a connecting module for communication.

In general, a communication device, such as a hub, needs an optical receiver/transmitter module to convert optical signals into electrical signals or other functional signals. The optical receiver/transmitter module comprises a housing and an optoelectronic transceiver configured to connect to a communication device by plug-and-play/hot-plug.

In FIG. 5A, a conventional optical receiver/transmitter module 5 has a body 51 and an optoelectronic transceiver 52 disposed in the body 51. A bump 511 and a sliding element 512 are formed on the front of the bottom surface of the body 51. In FIG. 5B, a communication device 7 has a connecting element 71 formed with a connecting hole 711. When the optical receiver/transmitter module 5 is engaged with the communication device 7, the bump 511 of the body 51 is coupled to the connecting hole 711 of the communication device 7. To separate the optical receiver/transmitter module 5 from the communication device 7, the sliding element 512 of the optical receiver/transmitter module 51 must be pushed toward the connecting element 71 of the communication device 7, to separate the bump 511 of the body 51 and the connecting hole 711 of the communication device 7.

However, the sliding element 512 of the body 51 cannot automatically return to an initial position when the body 51 is disengaged from the communication device 7. It is inconvenient for the user to reinsert the modulated body 51 into the communication device 7.

FIG. 5C shows the relationship between the optical receiver/transmitter module 5 and two vertically juxtaposed communication devices 7. Because the sliding element 512 is not extended from the front edge of the body 51 and the action of pushing the sliding element 512 is hindered by the adjacent module 5, the optical receiver/transmitter module 5 plugged into one of the juxtaposed communication devices 7 cannot be easily removed by merely pushing the sliding element 512.

SUMMARY

The invention provides an optical transceiver module or a connecting module with a detachable structure to increase utility of removing a communication device from the optical transceiver module.

The optical transceiver module of the invention also eliminates the difficulty of removing the optical transceiver module from a group of juxtaposed communication devices.

Still, the invention further provides another optical transceiver module with a detachable structure to conveniently swap a desired optical transceiver module from a group of juxtaposed communication devices and to reduce the interference therebetween.

The connecting module of the invention comprises a body, a housing and a transmission device. The transmission device disposed in the body comprises a fixed element, a slider movably supported by the fixed element, and a movable bar driving the slider to horizontally move. The body can remain at a constant volume and be detachably connected to the housing by the transmission device under lever principle to eliminate the interference therebetween.

Specifically, the connecting module further comprises a protrusion which is formed on the fixed element or the body and embedded in a through hole of the housing to engage or disengage the body and housing by the slider of the transmission device.

In another embodiment of the invention, the connecting module does not need the fixed element and the protrusion is directly formed on the body.

DESCRIPTION OF THE DRAWINGS

The invention can be more fully understood by reading the subsequent detailed description and examples with references made to the accompanying drawings, wherein.

DETAILED DESCRIPTION

Figure 1A:
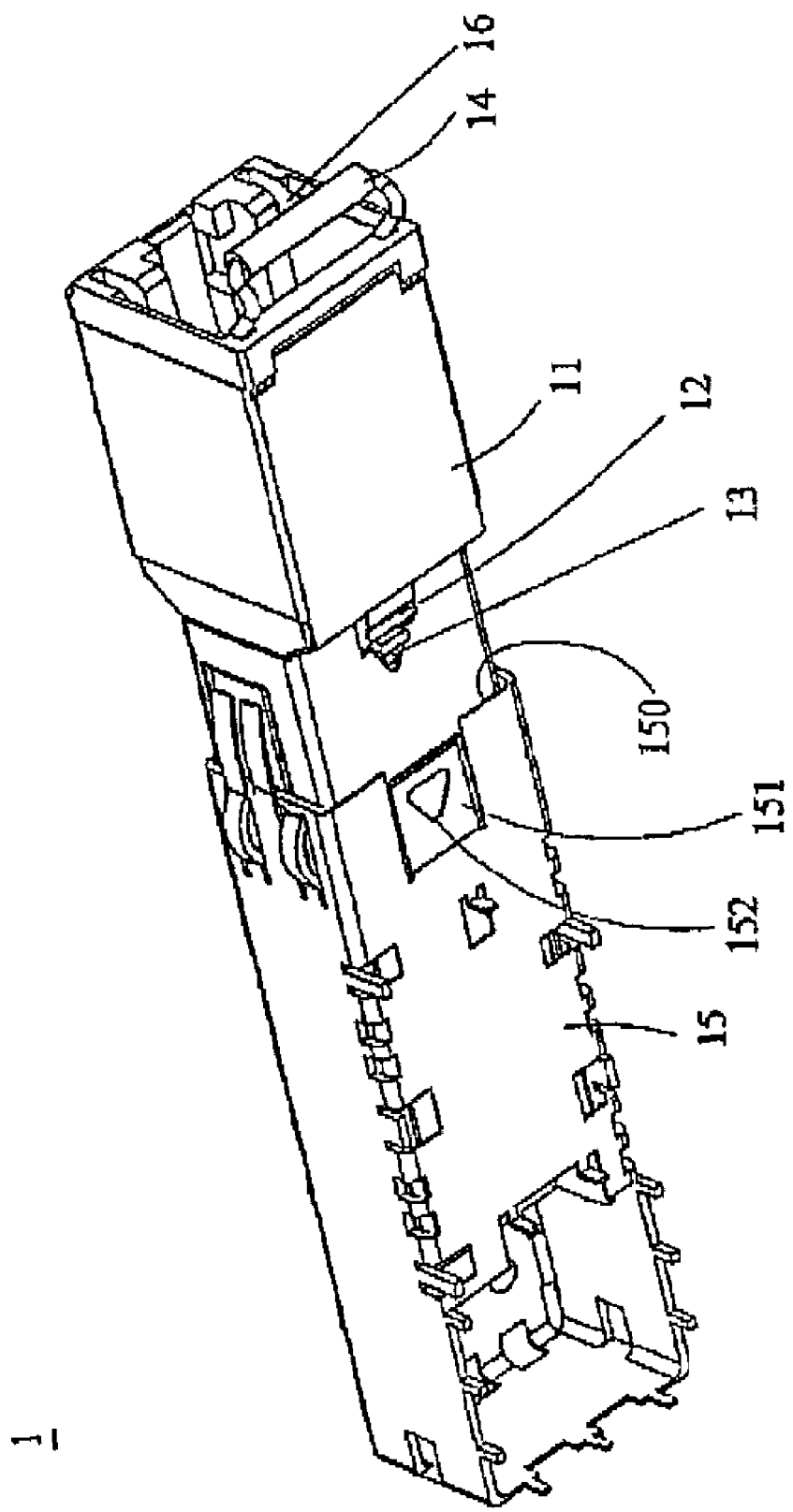
FIG. 1A is a schematic view of a connecting module of the first embodiment of the invention.
Figure 1B:
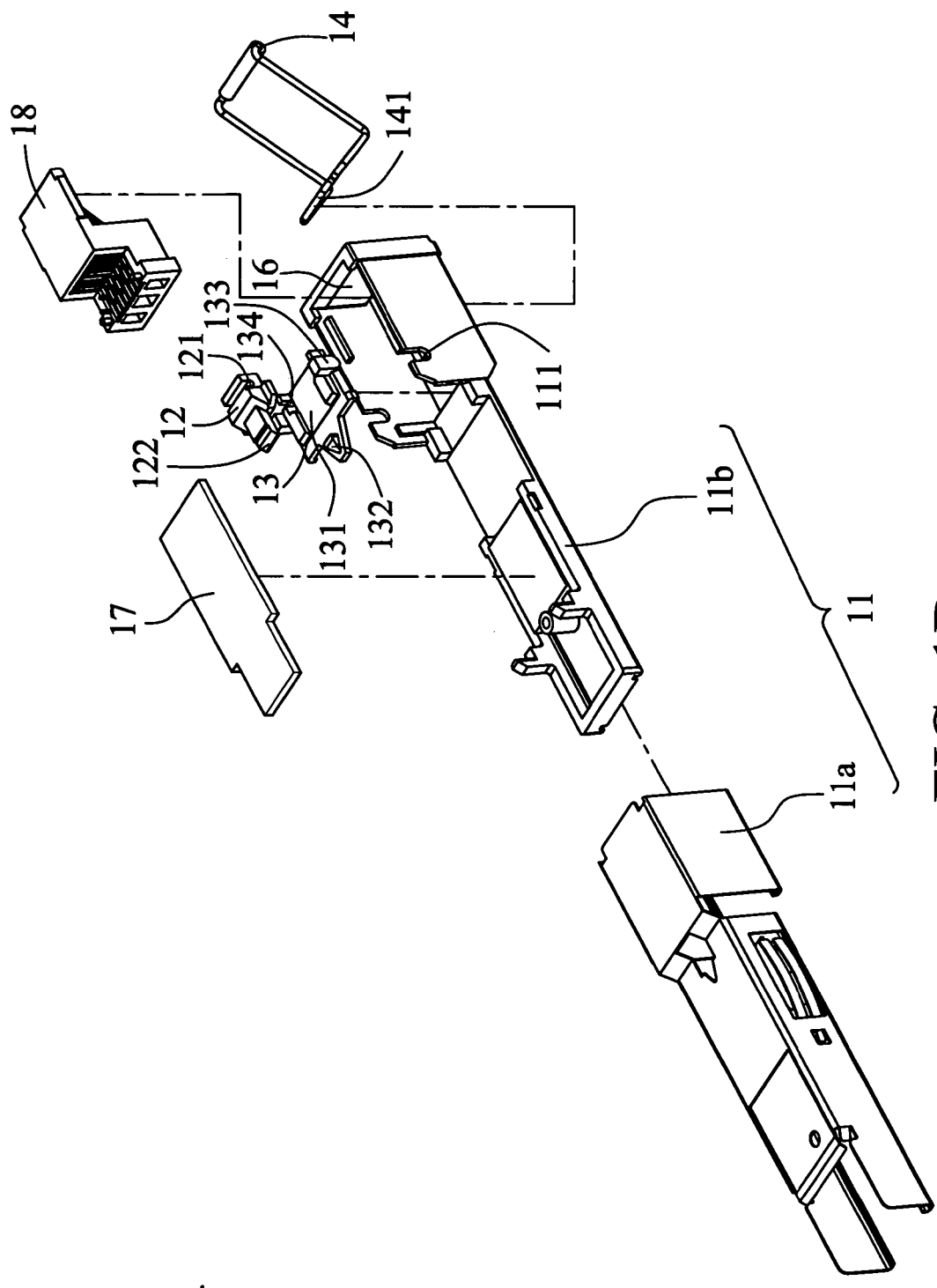
FIG. 1B is an exploded view of a body of the connecting module of FIG. 1A.

With reference to FIG. 1A and 1B, a connecting module or an electrical transceiver module 1 of the first embodiment of the invention comprises a detachable body 11 having an engaging slot 111, a slider 12 having a fastening slot 121 and a slanted surface 122 at one end thereof, a fixed element 13, a movable bar 14 having a fastening portion 141, and a housing 15 having an opening 150, an elastic piece 151 and a through hole 152 formed on the elastic piece 151.

As shown in FIG. 1B, the body 11 includes a first part 11a and a second part 11b enclosed by the first part 11a, and the body 11 is received in the housing 15 via the opening 150. The fixed element 13 has a guiding slot 131, a protrusion 132, two engaging portions 133 and a recess 134. The slider 12, the fixed element 13 and the movable bar 14 are engaged together to serve as a transmission device of the connecting module 1.

The second part 11b of the body 11 comprises a connecting hole 16, a circuit board 17 and a connecting head 18. The engaging slot 111 is formed on the two parallel sidewalls which define the connecting hole 16, and the connecting head 18 is disposed in the connecting hole 16.

When the circuit board 17 is connected to the connecting head 18, the movable bar 14 can be rested on the connecting head 18, to dispose the fastening portion 141 of the movable bar 14 on one side of the conjunction between the circuit board 17 and the connecting head 18. The connecting head 18 which is connected with the circuit board 17 and the movable bar 14 is then disposed in the body 11. After that, the slider 12 is guided into the guiding slot 131 of the fixed element 13, and the slanted surface 122 of the slider 12 is pressed against the protrusion 132 of the fixed element 13. The fixed element 13 is passed through the fastening portion 141 of the movable bar 14, and the engaging portions 133 of the fixed element 13 is engaged with the engaging slot 111 of the body 11, wherein the protrusion 132 of the fixed element 13 faces the circuit board 17. Finally, the fastening portion 141 of the movable bar 14 is connected to the fastening slot 121 of the slider 12 and the recess 134 of the fixed element 13. It is understood that the movable bar 14 is longitudinally moved along the connecting hole 16, thereby driving the slider 12 to move laterally.

Figure 1C:
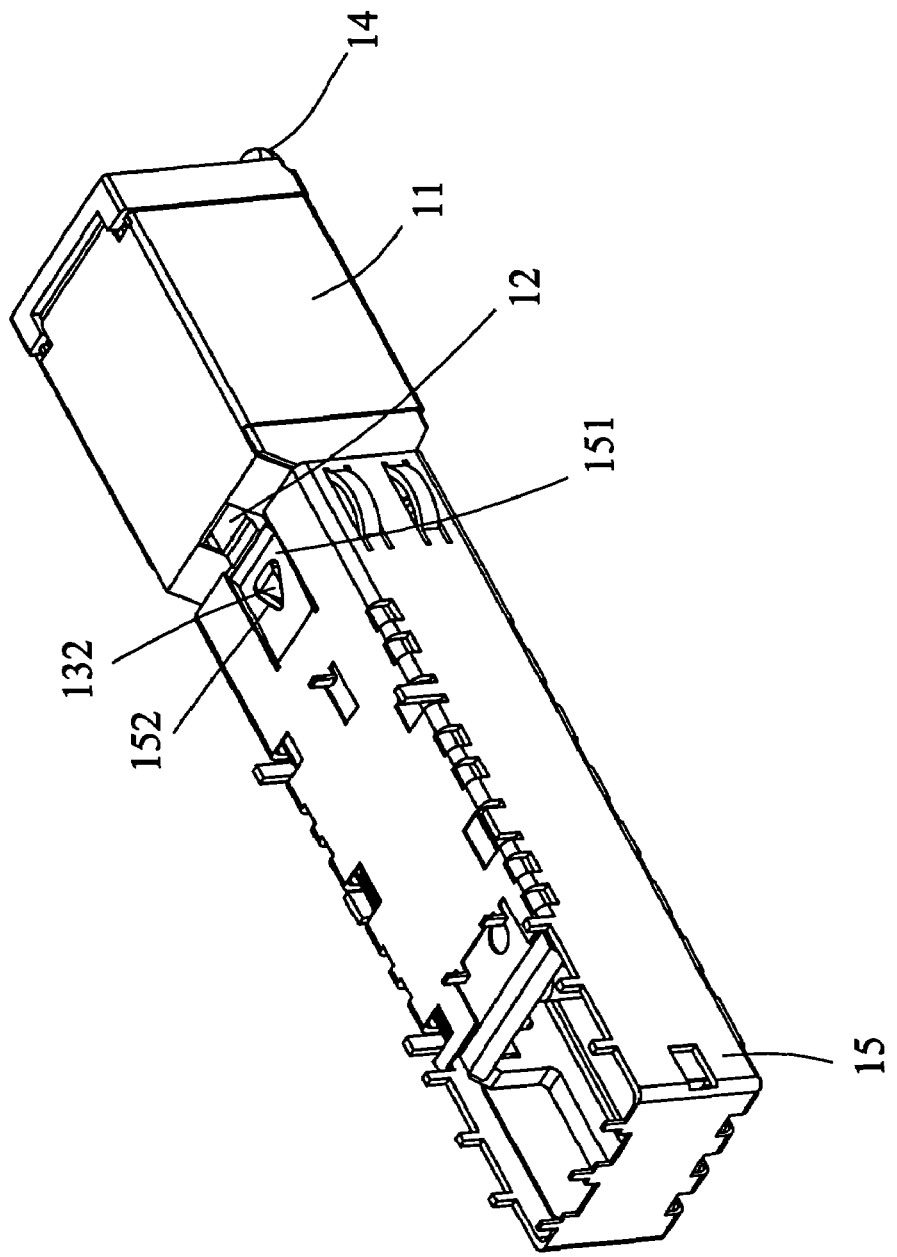
FIGS. 1C to 1E are views showing the operation of the connecting module of FIG. 1A.
Figure 1D:
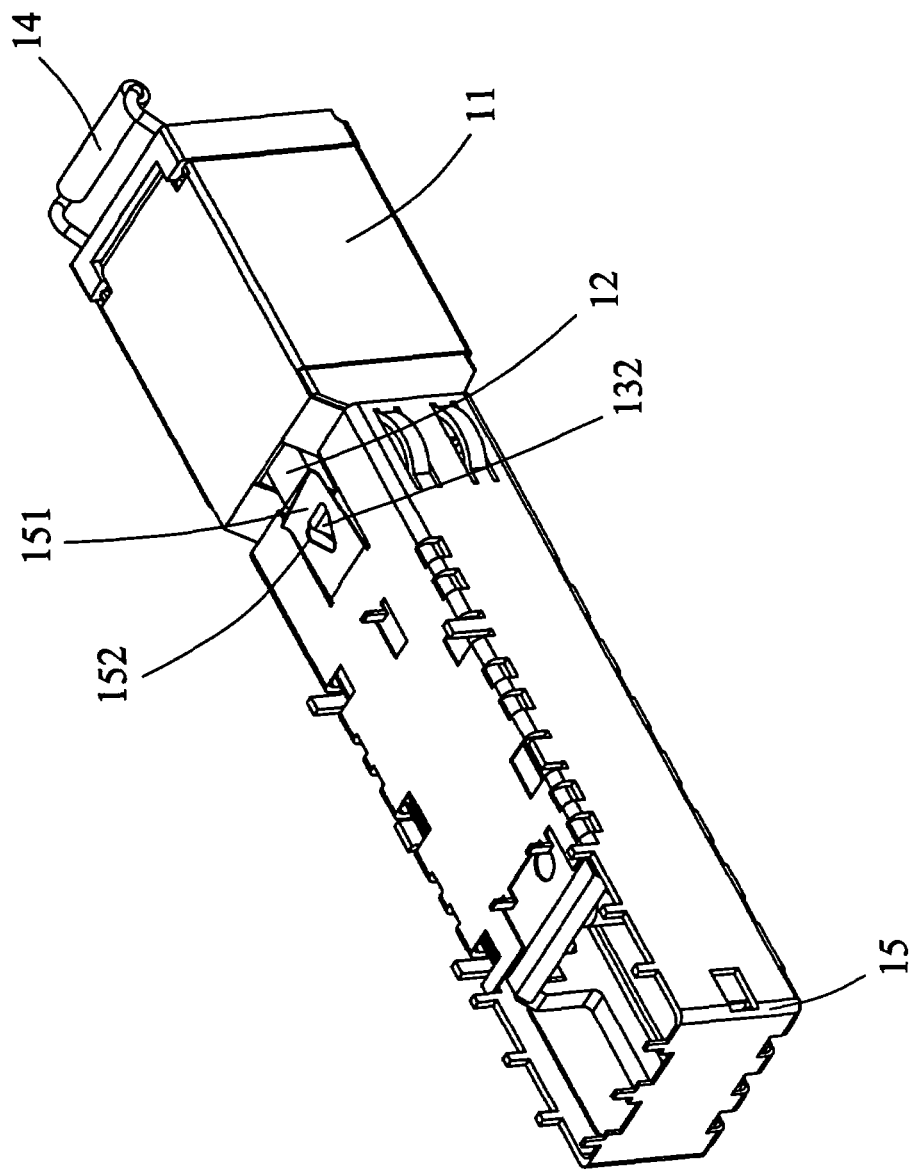
Figure 1E:
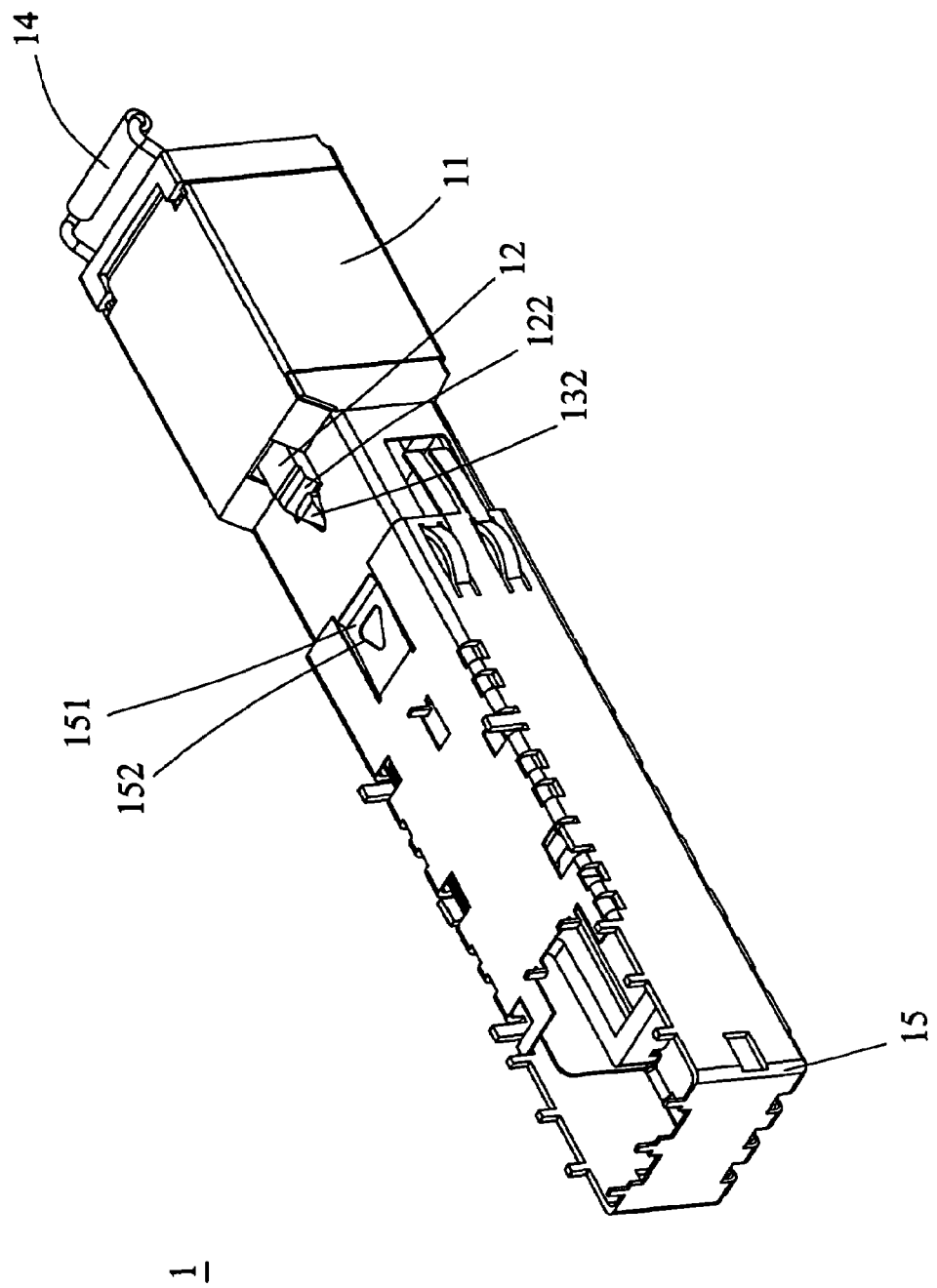

With reference to FIGS. 1C, 1D and 1E, according to the lever principle, the slider 12 can be moved by the movable bar 14. FIG. 1C shows that the movable bar 14 is located at a first position, where the slider 12 is far from the protrusion 132 of the fixed element 13, and the elastic piece 151 of the housing 15 is embedded in the clearance between the slider 12 and the protrusion 132 of the fixed element 13. That is, the protrusion 132, at least partially, penetrates the through hole 152 of the housing 15 and is exposed to the exterior. Therefore, the housing 15 is securely connected to the body 11. Additionally, the body 11 can receive an externally connecting head of a communication device (not shown) via the connecting hole 16 of the body 11.

FIG. 1D shows the movable bar 14 is located at a second position, where the protrusion 132 of the fixed element 13 is disengaged from the through hole 152 of the housing 15. The recess 134 of the fixed element 13 functions as a supporting point to support the fastening portion 141. Under the lever principle, an applied force on the movable bar 14 is converted into an active force driving the slider 12 to horizontally move along the guiding slot 131 of the fixed element 13, and accordingly the slanted surface 122 of the slider 12 presses against and lifts the elastic piece 151 to disengage the protrusion 132 from the through hole 152. Thus the body 11, as shown in FIG. 1E can be removed from the housing 15.

As described above, the body 11 is engaged with or disengaged from the housing 15 by the movable bar 14. As the body 11 is removed from the housing 15, the movable bar 14 is able to return to the first position (FIG. 1C), to engage the same or other housing.

Figure 2A:
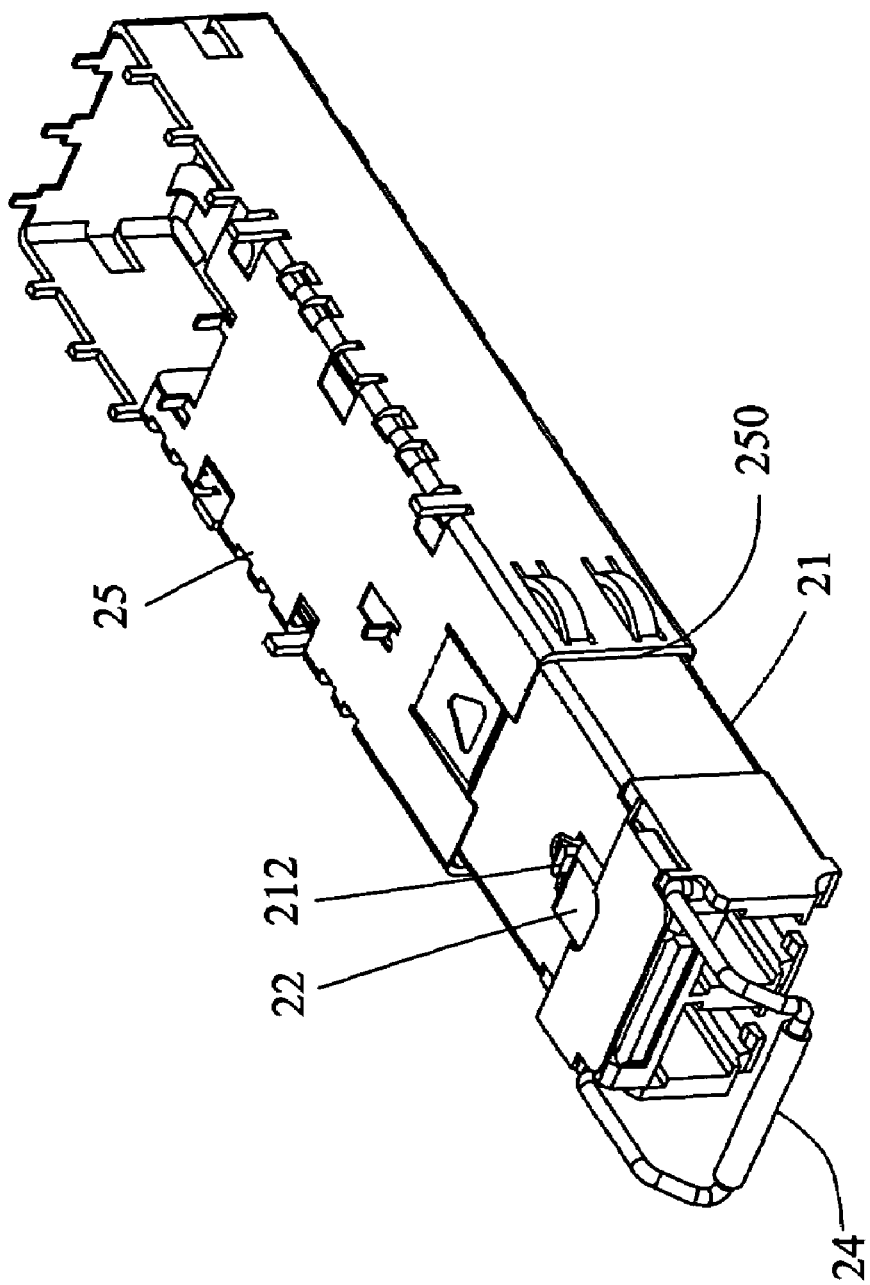
FIG. 2A is a schematic view of a connecting module of the second embodiment of the invention.
Figure 2B:
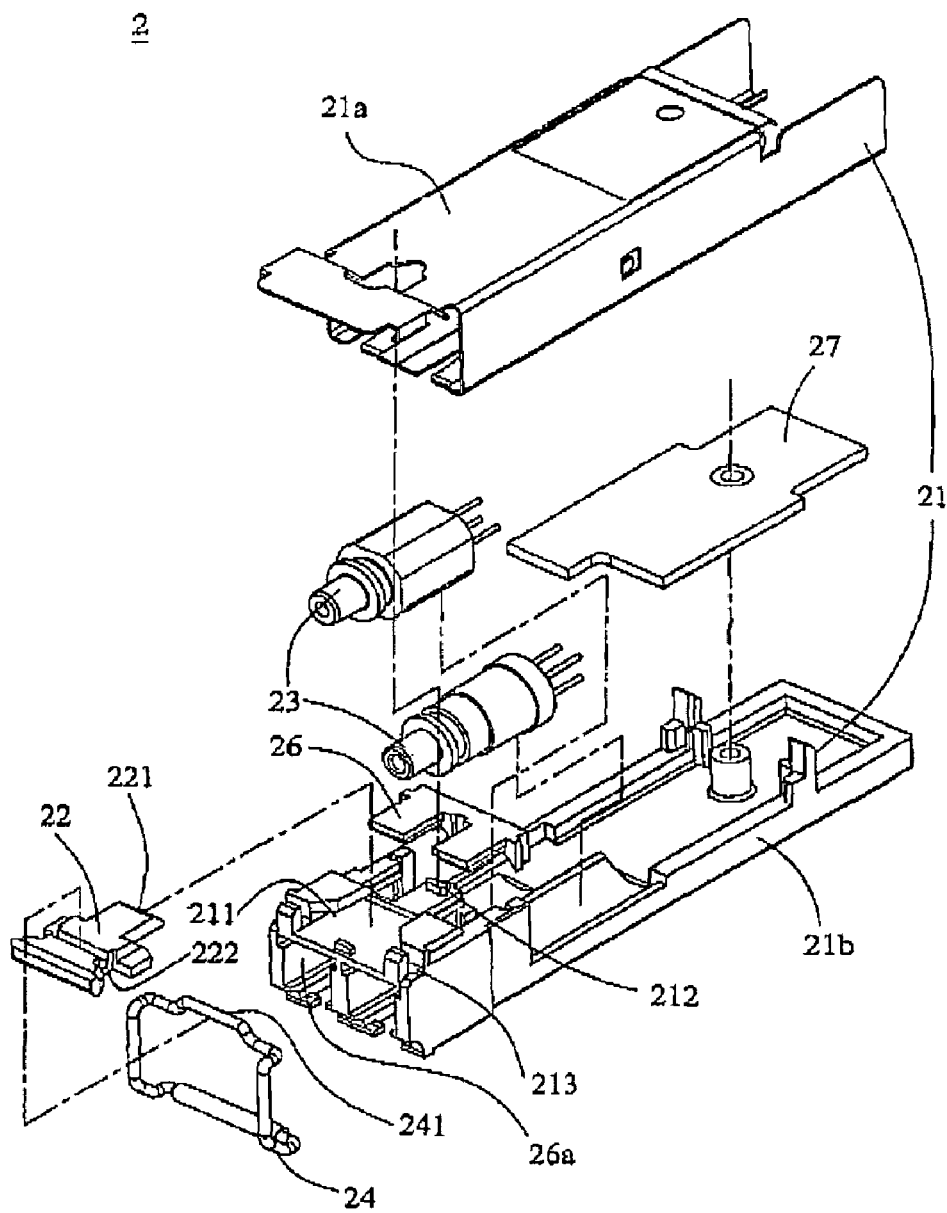
FIG. 2B is an exploded view of a body of the connecting module of FIG. 2A.

With reference to FIGS. 2A and 2B, a connecting module or an optical transceiver module 2, the second embodiment of the invention, comprises a body 21 having a first part 21a and a second part 21b enclosed by the first part 21a and formed with a connecting hole 26a, a guiding slot 211, a protrusion 212 and a recess 213; a slider 22 having a slanted surface 221 and a fastening slot 222; a movable bar 24 having a fastening portion 241; at least one optical converter 23; a housing 25 having an opening 250; a block 26; and a circuit board 27. The slider 22 and the movable bar 24 are connected together to serve as a transmission device of the connecting module 2.

The optical converter 23 is connected with the circuit board 27 and is fixedly disposed in the second part 21b of the body 21 by the block 26. The slider 22 is moved into the second part 21b of the body 21 along the guiding slot 211 and the slanted surface 221 of the slider 22 is pressed against the protrusion 212 of the second part 21b of the body 21. Also, the fastening portion 241 of the movable bar 24 can be connected to the fastening slot 222 of the slider 22 and the recess 213 of the body 21.

In this embodiment, the movable bar 24 can move the slider 22 under the lever principle. The connecting module 2 of the second embodiment differs from the first embodiment in that the fixed element appeared in the first embodiment is omitted and the protrusion 212 is directly formed on the second part 21b of the body 21. The components of the connecting module 2 are fewer than that of the connecting module 1, i.e., the structure of the connecting module 2 is simplified.

Figure 3A:
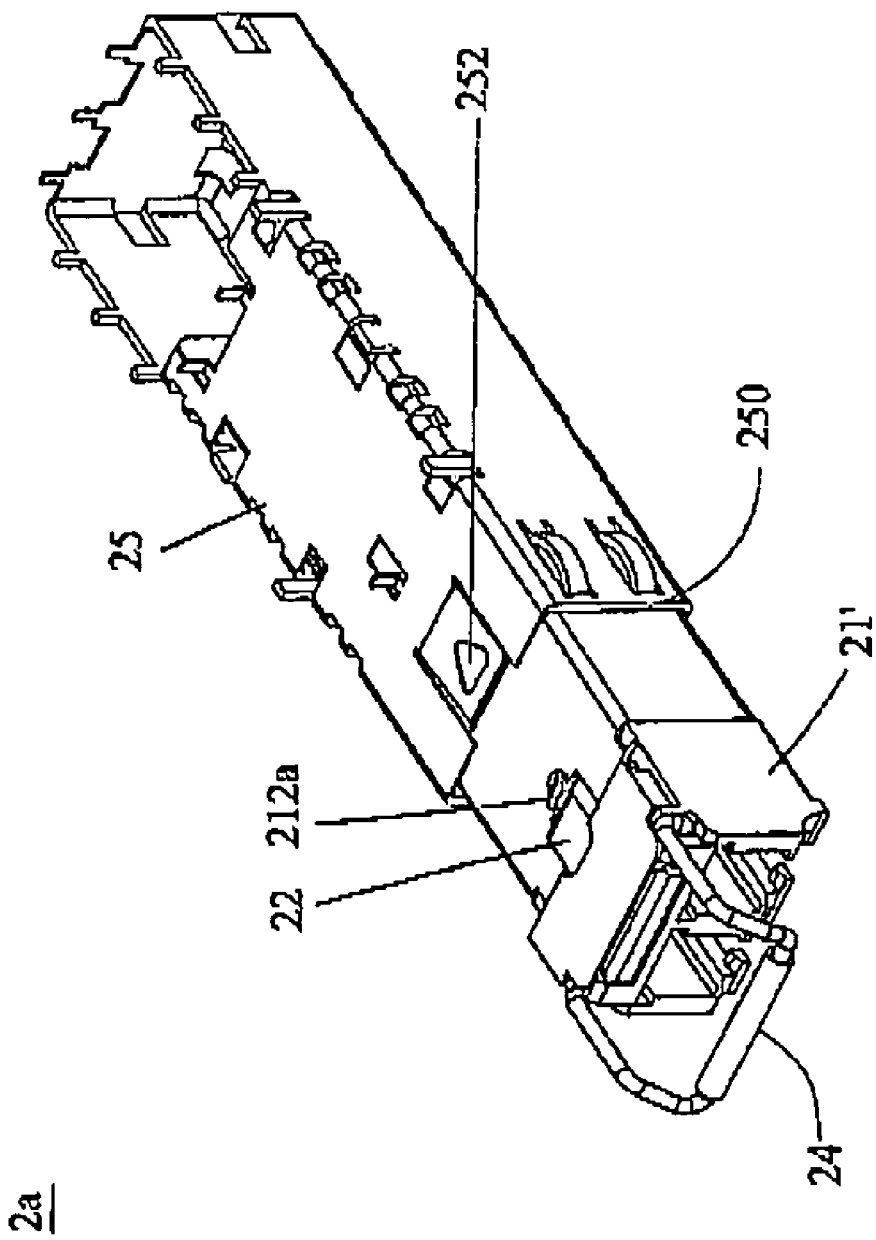
FIG. 3A is a schematic view of a connecting module of a third embodiment of the invention.
Figure 3B:
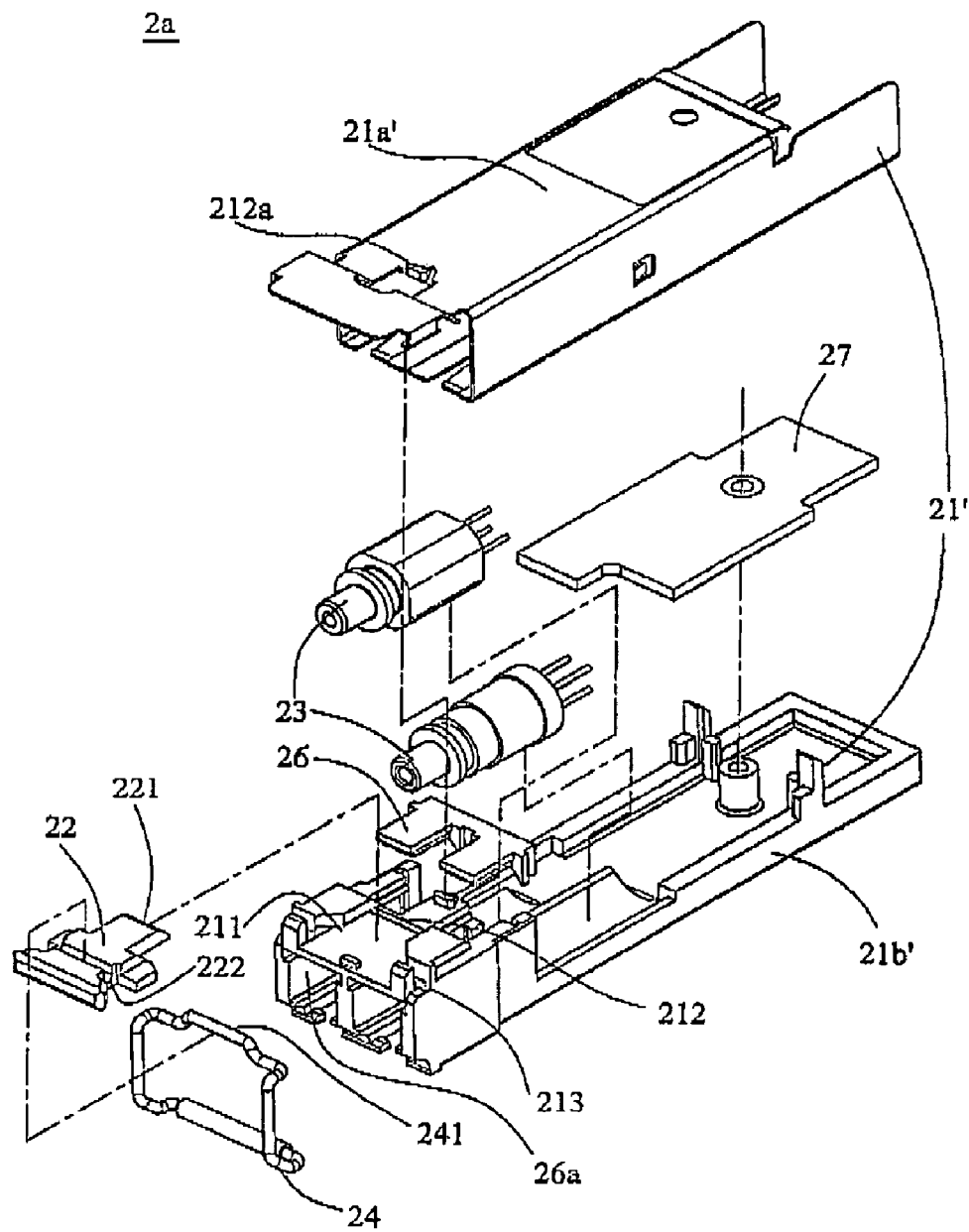
FIG. 3B is an exploded view of a body of the connecting module of FIG. 3A.

With reference to FIGS. 3A and 3B, a connecting module or an optical transceiver module 2a, the third embodiment of the invention, comprises a body 21' having a first part 21a' formed with a protrusion 212a, and a second part 21b' enclosed by the first part 21a' and formed with a connecting hole 26a; a slider 22 having a slanted surface 221; at least one optical converter 23; a movable bar 24; a housing 25 having an opening 250 to receive the body 21' and a through hole 252 engaged with the protrusion 212a; a block 26; and a circuit board 27. The slider 22 and the movable bar 24 are connected together to serve as a transmission device of the connecting module 2a.

The optical converter 23 is connected to the circuit board 27, and is securely disposed in the body 21' by the block 26. The slider 22 is moved into the second part 21b' along the guiding slot 211, and the fastening portion 241 of the movable bar 24 is connected to the fastening slot 222 of the slider 22 and the recess 213 of the second part 21b' of the body 21. Finally, the first part 21a' and the second part 21b' are combined so that the slanted surface 221 of the slider 22 is pressed against the protrusion 212a of the first part 21a'. The protrusion 212a and the first part 21a' can be integrally formed by pressing.

Figure 4A:
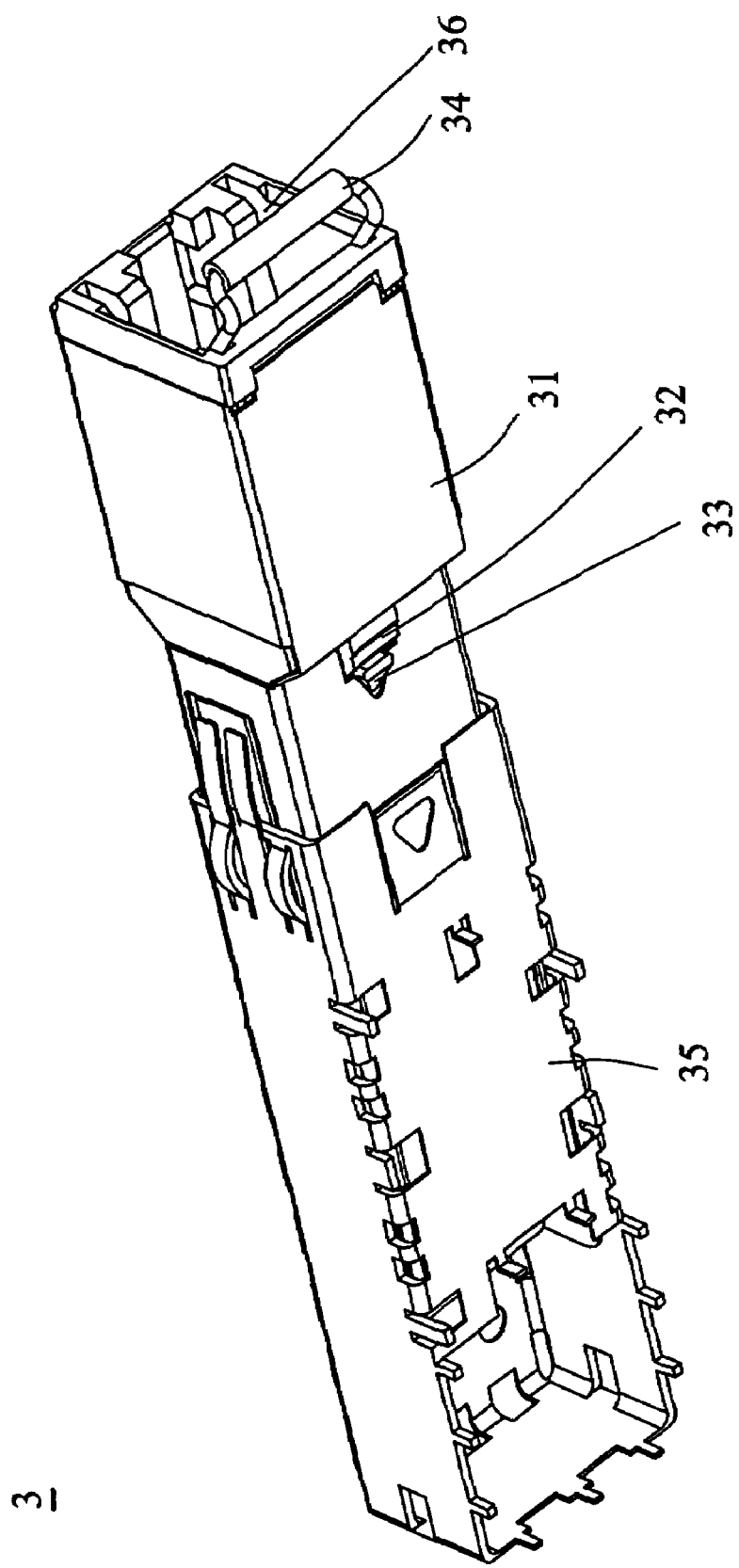
FIG. 4A is a schematic view of a connecting module of a fourth embodiment of the invention.
Figure 4B:
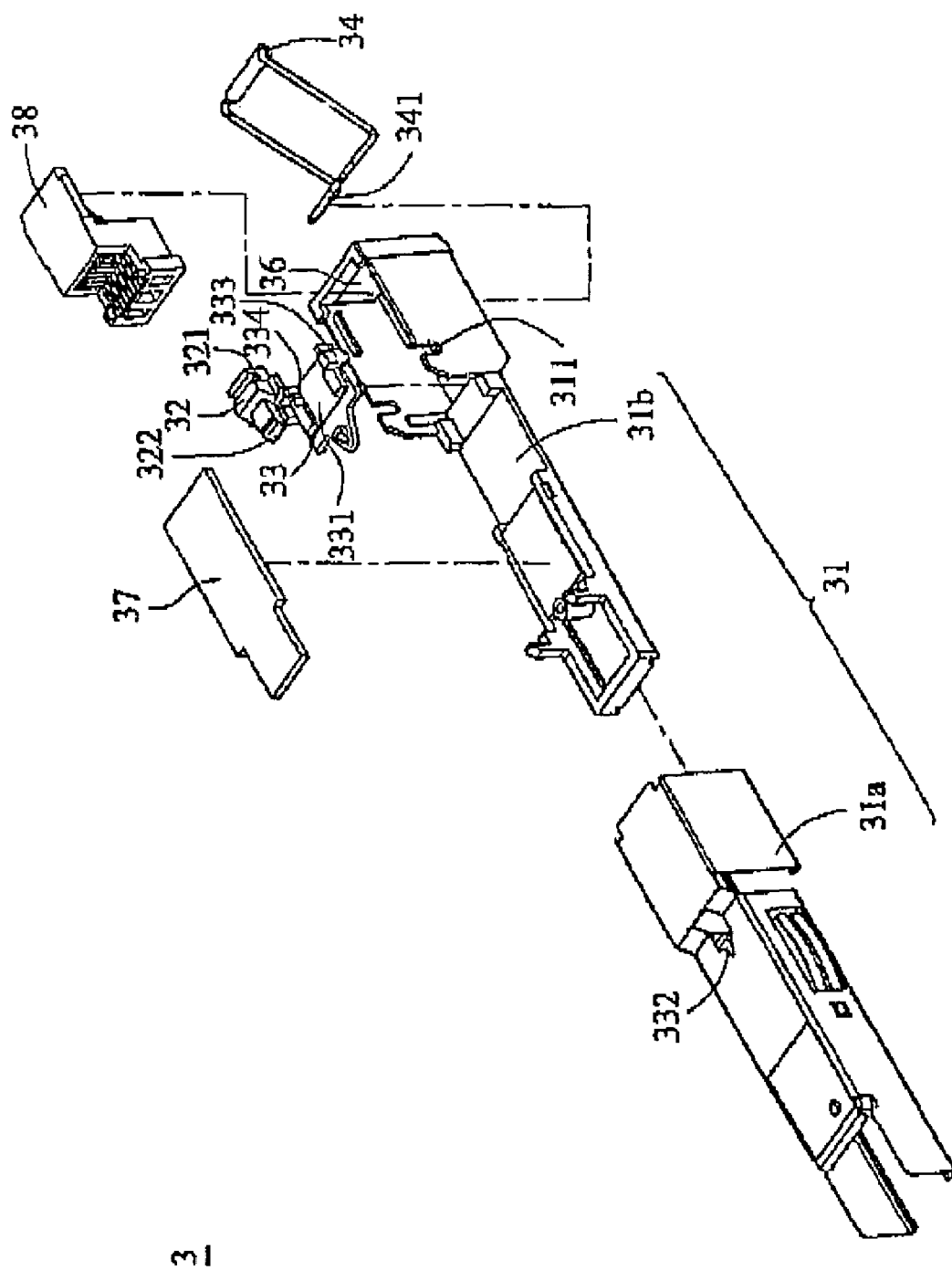
FIG. 4B is an exploded view of a body of the connecting module of FIG. 4A.
Figure 5A:
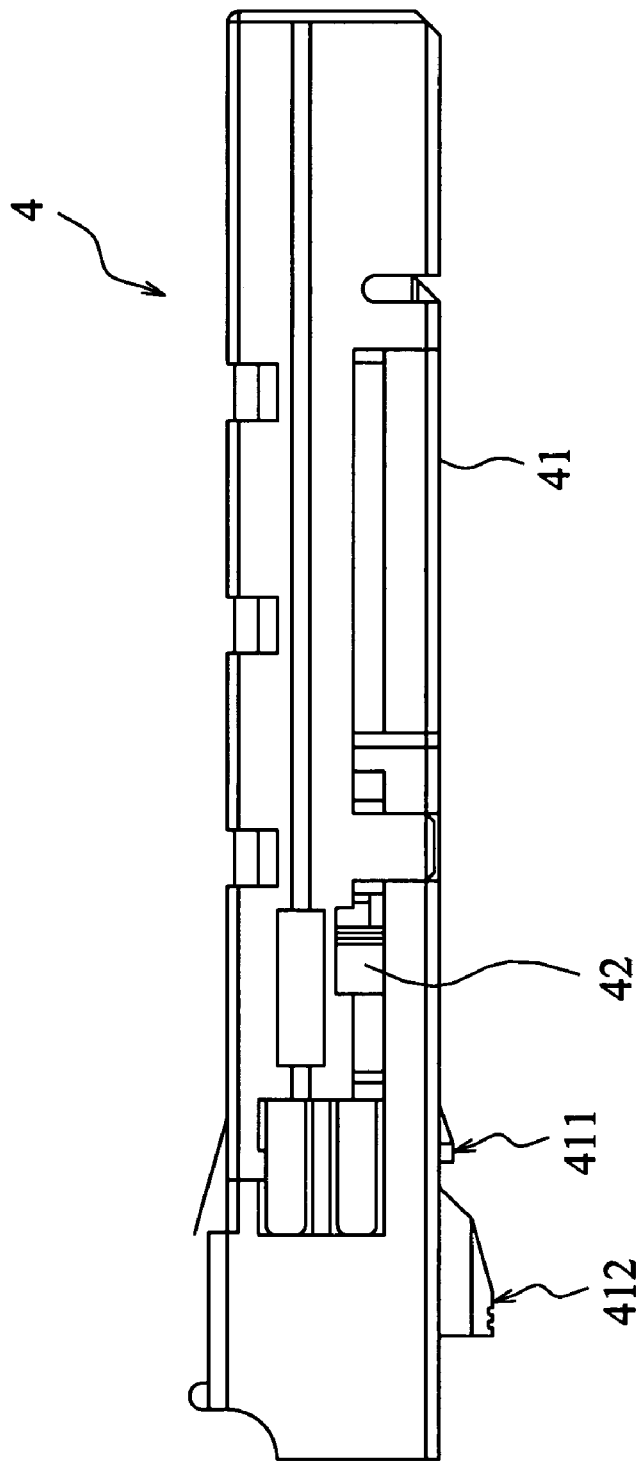
FIG. 5A is a sectional view of a conventional optical receiver/transmitter module.
Figure 5B:
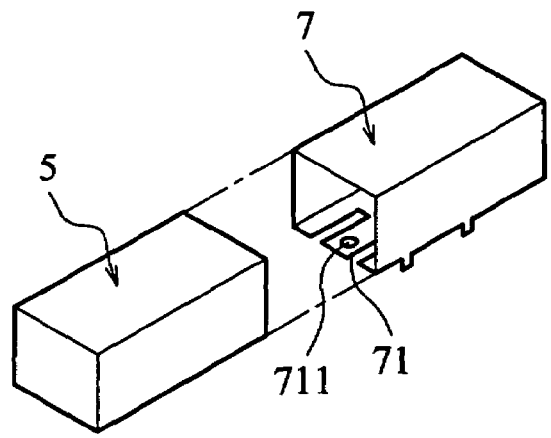
FIG. 5B is a perspective view showing a conventional optical receiver/transmitter module connected to a communication device.
Figure 5C:
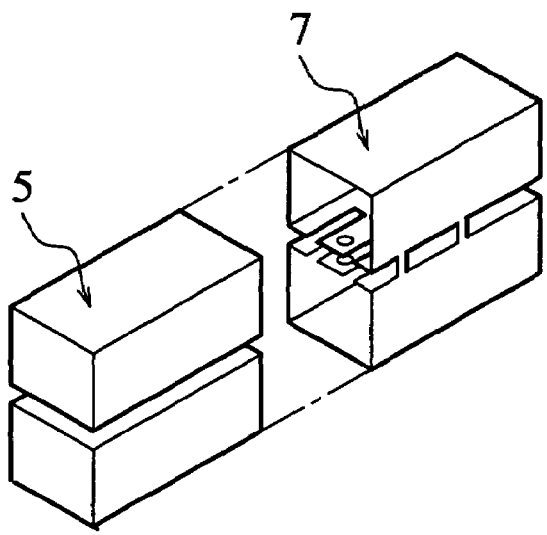
FIG. 5C is a perspective view showing a conventional optical receiver/transmitter module and two vertically juxtaposed communication devices.

With reference to FIGS. 4A and 4B, a connecting module 3 of a fourth embodiment of the invention comprises a body 31, a slider 32 having a slanted surface 322, a fixed element 33, a movable bar 34 and a housing 35. The slider 32, the fixed element 33 and the movable bar 34 are connected to serve as a transmission device of the connecting module 3.

The body 31 comprises a first part 31a having a protrusion 332, and a second part 31b enclosed by the first part 31a and having a connecting hole 36, a circuit board 37 and a connecting head 38. An engaging slot 311 is formed on the two parallel sidewalls which define the connecting hole 36, and the connecting head 38 disposed in the connecting hole 36 is connected to the circuit board 37. The protrusion 332 and the first part 31a can be integrally formed by pressing.

When the circuit board 37 is connected to the connecting head 38, the movable bar 34 can be rested on the connecting head 38, to dispose the fastening portion 341 of the movable bar 34 on one side of the conjunction between the circuit board 37 and the connecting head 38. The connecting head 38 connected with the circuit board 37 and the movable bar 34 is then disposed in the second part 31b. After that, the slider 32 is guided into the guiding slot 331 of the fixed element 33. The fixed element 33 is passed through the fastening portion 341 of the movable bar 34, and the engaging portions 333 of the fixed element 33 is engaged with the engaging slot 311 of the second part 31b of the body 31. Then the fastening portion 341 is engaged with the fastening slot 321 and the recess 334 in the second part 31b. Finally, the slanted surface 322 of the slider 32 is pressed against the protrusion 332 of the first part 31a of the body 31, wherein the protrusion 332 faces the circuit board 37.

According to the invention as described above, the connecting module can use a single housing to connect exterior circuit board, or use a plurality of juxtaposed housings to connect exterior circuit board. Also, the shape of the protrusion is not limited to the described embodiments, but, on the contrary, the protrusion is formed wit a shape corresponding to the through hole of the housing.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A connecting module comprising:
   a body comprising a guiding slot, a protrusion disposed with respect to the guiding slot, at least one connecting hole for connecting with an external connecting head, and at least one circuit board disposed therein;
   a transmission device disposed in the body and comprising a slider movably guided by the guiding slot of the body and a movable bar for moving the slider, wherein the movable bar is longitudinally moved along the connecting hole and drives the slider to move laterally; and
   a housing comprising an opening for receiving the body, wherein the body is detachably connected to the housing by the transmission device.

2. The connecting module as claimed in claim 1, wherein the connecting module is an electrical transceiver module or optical transceiver module.

3. The connecting module as claimed in claim 1, wherein the movable bar comprises a fastening portion, the slider comprises a fastening slot connected to the fastening portion, and the body comprises at least one recess functioning as a supporting point to support the fastening portion so that the movable bar is able to move the slider.

4. The connecting module as claimed in claim 1, wherein the body further comprises a fixed element for supporting the slider to move, and the protrusion is formed on the fixed element of the body.

5. The connecting module as claimed in claim 1, wherein the housing further comprises an elastic piece and a through hole which is formed on the elastic piece and corresponding to the protrusion of the body, and the movable bar drives the slider to approach or move away from the elastic piece.

6. The connecting modules as claimed in claim 5, wherein the slider comprise a slanted surface at one end thereof to press against the elastic piece of the housing.

7. A connecting module comprising:
   a body comprising a protrusion and at least one connecting hole;
   a transmission device comprising a slider and a movable bar for moving the slider, wherein the movable bar longitudinally moved along the connecting hole drives the slider to move laterally; and
   a housing comprising an opening for receiving the body, wherein the body is detachably connected to the housing by the transmission device.

8. The connecting module as claimed in claim 7, wherein the housing further comprises an elastic piece and a through hole formed on the elastic piece and corresponding to the protrusion of the body, wherein the movable bar drives the slider to approach or move away from the elastic piece.

9. The connecting module as claimed in claim 7, wherein the slider comprise a slanted surface at one end thereof to press against the elastic piece of the housing.

10. The connecting module as claimed in claim 7, wherein the movable bar comprises a fastening portion, the slider comprises a fastening slot connected to the fastening portion, and the body comprises at least one recess functioning as a supporting point to support the fastening portion so that the movable bar is able to move the slider.

11. The connecting module as claimed din claim 7, wherein the body further comprises a fixed element for supporting the slider to move, and the protrusion is formed on the fixed element of the body.

12. The connecting module as claimed in claim 7, wherein the connecting module is an electrical transceiver module or an optical transceiver module.

13. The connecting module as claimed din claim 7, wherein the body has a first part and a second part enclosed by the first part, the transmission device is disposed in the second part, and the protrusion is formed on the second part.

14. The connecting module as claimed in claim 7, wherein the body has a first part and a second part enclosed by the first part, the transmission device is disposed in the second part, and the protrusion is integrally formed with the first part as a single unit.

15. The connecting module as claimed in claim 7, wherein the body further comprises a guiding slot for guiding the slider, an external connecting head connected with the connecting hole, and at least one circuit board connected to the external connecting head.

16. The connecting module as claimed in claim 15, further comprising at least one converter disposed in the body and connected with the circuit board.

\* \* \* \* \*